(12) United States Patent
Guru et al.

(10) Patent No.: US 11,146,944 B1
(45) Date of Patent: Oct. 12, 2021

(54) MOBILE PHONE PEER-TO-PEER ELECTRONIC SUBSCRIBER IDENTITY MODULE (ESIM) TRANSFER

(71) Applicant: T-MOBILE INNOVATIONS LLC, Overland Park, KS (US)

(72) Inventors: Balasubramaniam Guru, Overland Park, KS (US); Ryan P. Dreiling, Shawnee, KS (US); Philip W. Uehling, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 47 days.

(21) Appl. No.: 16/796,373

(22) Filed: Feb. 20, 2020

(51) Int. Cl.
| | |
|---|---|
| *H04W 8/18* | (2009.01) |
| *H04W 4/50* | (2018.01) |
| *H04W 8/20* | (2009.01) |
| *H04W 4/70* | (2018.01) |
| *H04L 29/12* | (2006.01) |
| *H04W 4/80* | (2018.01) |
| *H04W 12/06* | (2021.01) |
| *H04W 12/72* | (2021.01) |

(52) U.S. Cl.
CPC .......... *H04W 8/20* (2013.01); *H04L 61/6054* (2013.01); *H04W 4/70* (2018.02); *H04W 4/80* (2018.02); *H04W 8/183* (2013.01); *H04W 12/068* (2021.01); *H04W 12/72* (2021.01)

(58) Field of Classification Search
None
See application file for complete search history.

(56) References Cited

U.S. PATENT DOCUMENTS

| | | | |
|---|---|---|---|
| 9,184,801 B2 | 11/2015 | Li et al. | |
| 9,198,024 B1 | 11/2015 | Khalid et al. | |
| 9,560,693 B2* | 1/2017 | Schell | H04L 63/18 |
| 9,831,903 B1* | 11/2017 | Narasimhan | H04M 17/023 |
| 9,949,113 B1* | 4/2018 | Vasudevan | H04W 8/205 |
| 10,057,760 B2 | 8/2018 | Yang et al. | |
| 10,061,942 B2 | 8/2018 | Yang et al. | |

(Continued)

OTHER PUBLICATIONS

Notice of Allowance dated Apr. 30, 2020, U.S. Appl. No. 16/665,941, filed Oct. 28, 2019.

(Continued)

*Primary Examiner* — Gary Lafontant

(57) ABSTRACT

A method of sharing electronic subscriber identity module (eSIM) credentials between two mobile communication devices. The method comprises changing a state of an eSIM of the first device by an eSIM sharing application executing on the first device to a transfer-in-progress state, transmitting eSIM credentials to the second device via a peer-to-peer wireless communication link by the eSIM sharing application, where the eSIM sharing application reads the eSIM credentials from the eSIM of the first device, changing a state of the eSIM of the first device by the eSIM sharing application to a disabled-transferred state, and transmitting a disabled-transferred message to the second device via the peer-to-peer wireless communication link by the eSIM sharing application, whereby the second device is enabled to communicate on a cellular wireless communication network based on authentication using the eSIM credentials transmitted by the first device.

20 Claims, 12 Drawing Sheets

(56) References Cited

U.S. PATENT DOCUMENTS

| | | | |
|---|---|---|---|
| 10,141,966 B2 | 11/2018 | Narasimhan et al. | |
| 10,142,917 B2 | 11/2018 | Narasimhan et al. | |
| 10,149,145 B2 | 12/2018 | Li et al. | |
| 10,149,150 B1 | 12/2018 | Vasudevan et al. | |
| 10,244,501 B2* | 3/2019 | Miao | H04W 60/00 |
| 10,277,587 B2* | 4/2019 | Li | H04W 12/0431 |
| 10,277,734 B2 | 4/2019 | Hentschel | |
| 10,334,427 B2 | 6/2019 | Yang | |
| 10,356,614 B2 | 7/2019 | Li et al. | |
| 10,368,235 B1 | 7/2019 | Balasubramanian et al. | |
| 10,382,919 B2 | 8/2019 | Karimli et al. | |
| 10,405,181 B2 | 9/2019 | Li et al. | |
| 10,425,118 B2 | 9/2019 | Yang | |
| 10,652,728 B1 | 5/2020 | Guday et al. | |
| 10,681,665 B2 | 6/2020 | Singh et al. | |
| 10,687,298 B2 | 6/2020 | Miao et al. | |
| 10,708,766 B1 | 7/2020 | Umamaheswaran et al. | |
| 10,764,746 B1* | 9/2020 | Dreiling | H04W 4/60 |
| 10,820,189 B2* | 10/2020 | Dumoulin | H04W 8/245 |
| 11,064,347 B1 | 7/2021 | Dreiling et al. | |
| 2015/0350876 A1 | 12/2015 | Khalid et al. | |
| 2018/0352425 A1 | 12/2018 | Vasudevan et al. | |
| 2018/0352530 A1 | 12/2018 | Singh et al. | |
| 2019/0037401 A1 | 1/2019 | Egner et al. | |
| 2019/0174299 A1 | 6/2019 | Ullah et al. | |
| 2019/0208417 A1 | 7/2019 | Kang et al. | |
| 2019/0289455 A1 | 9/2019 | Namiranian | |
| 2019/0327591 A1 | 10/2019 | Karimli et al. | |
| 2019/0349743 A1 | 11/2019 | Hamblet | |
| 2019/0387396 A1 | 12/2019 | Gui | |
| 2020/0059778 A1 | 2/2020 | Li et al. | |
| 2020/0137557 A1 | 4/2020 | Touati et al. | |
| 2020/0260241 A1 | 8/2020 | Sicard | |

OTHER PUBLICATIONS

Dreiling, Ryan P., et al., "Electronic Subscriber Identity Module (ESIM) Transfer From Inactive Device," filed Oct. 28, 2019, U.S. Appl. No. 16/675,188.

Uehling, Phillip W., et al., "Electronic Subscriber Identity Module (ESIM) Transfer via Activation Code," filed Nov. 5, 2019, U.S. Appl. No. 16/675,188.

Office Action dated Mar. 9, 2021, U.S. Appl. No. 16/675,188, filed Nov. 5, 2019.

Office Action dated Sep. 3, 2020, U.S. Appl. No. 16/933,989, filed Jul. 20, 2020.

Notice of Allowance dated Mar. 22, 2021, U.S. Appl. No. 16/933,989, filed Jul. 20, 2020.

Dreiling, Ryan P., et al., "Electronic Subscriber Identity Module (ESIM) Transfer From Inactive Device," filed Jul. 20, 2020, U.S. Appl. No. 16/933,989.

Notice of Allowance dated Jun. 14, 2021, U.S. Appl. No. 16/675,188, filed Nov. 5, 2019.

* cited by examiner

MOBILE PHONE PEER-TO-PEER ELECTRONIC SUBSCRIBER IDENTITY MODULE (ESIM) TRANSFER

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Mobile communication devices provide authentication information to cell sites when they attach to the radio access network to receive wireless communication services. This authentication information allows the wireless service provider to identify the mobile communication device and determine if the device has privileges for accessing its network. Sometimes this authentication information is stored on a subscriber identity module (SIM) that is installed into the mobile communication device. This may be referred to as a traditional SIM in some contexts. A traditional SIM is a smart card that can be installed into a first mobile communication device to provide the first device access to a radio access network. The traditional SIM can be removed from the first mobile communication device and installed into a second mobile communication device to provide the second device access to the radio access network. This may be referred to as "pop-and-swap" in some contexts.

SUMMARY

In an embodiment, a method of sharing electronic subscriber identity module (eSIM) credentials between two mobile communication devices is disclosed. The method comprises establishing a peer-to-peer wireless communication link from a first mobile communication device to a second mobile communication device by the first device, changing a state of an eSIM of the first device by an eSIM sharing application executing on the first device to a transfer-in-progress state, and transmitting eSIM credentials to the second device via the peer-to-peer wireless communication link by the eSIM sharing application, where the eSIM sharing application reads the eSIM credentials from the eSIM of the first device. The method further comprises changing a state of the eSIM of the first device by the eSIM sharing application to a disabled-transferred state and transmitting a disabled-transferred message to the second device via the peer-to-peer wireless communication link by the eSIM sharing application, whereby the second device is enabled to communicate on a cellular wireless communication network based on authentication using the eSIM credentials transmitted by the first device.

In another embodiment, a method of sharing electronic subscriber identity module (eSIM) credentials between two mobile communication devices is disclosed. The method comprises establishing a peer-to-peer wireless communication link between a first mobile communication device and a second mobile communication device, presenting a user interface on the second device by an eSIM sharing application executing on the second device, where the user interface prompts for input of an eSIM transfer user code, receiving the eSIM transfer user code by the eSIM sharing application from the user interface, and validating the eSIM transfer user code by the eSIM sharing application. The method further comprises receiving eSIM credentials from the first device via the peer-to-peer wireless communication link by the eSIM sharing application, storing the eSIM credentials in an eSIM of the second device, and receiving a disabled-transferred message from the first device via the peer-to-peer wireless communication link by the eSIM sharing application. The method further comprises changing a state of the eSIM of the second device by the eSIM sharing application to a disabled state, prompting the user by the user interface to select the second device for transfer of the eSIM credentials and to use the second device for cellular wireless communication, receiving an eSIM transfer input by the eSIM sharing application from the user interface, and changing the state of the eSIM of the second device by the eSIM sharing application to an enabled state, whereby the second device is enabled to communicate on a cellular wireless communication network based on authentication using the eSIM credentials received from the first device.

In yet another embodiment, a method of sharing electronic subscriber identity module (eSIM) credentials between two mobile communication devices is disclosed. The method comprises establishing a peer-to-peer wireless communication link from a first mobile communication device to a second mobile communication device by the first device, changing a state of an eSIM of the first device by an eSIM sharing application executing on the first device to a transfer-in-progress state, and transmitting eSIM credentials to the second device via the peer-to-peer wireless communication link by the eSIM sharing application, where the eSIM sharing application reads the eSIM credentials from the eSIM of the first device. The method further comprises deleting eSIM credentials from the eSIM of the first device by the eSIM sharing application and transmitting an eSIM deleted message to the second device via the peer-to-peer wireless communication link by the eSIM sharing application, whereby the second device is enabled to communicate on a cellular wireless communication network based on authentication using the eSIM credentials transmitted by the first device.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
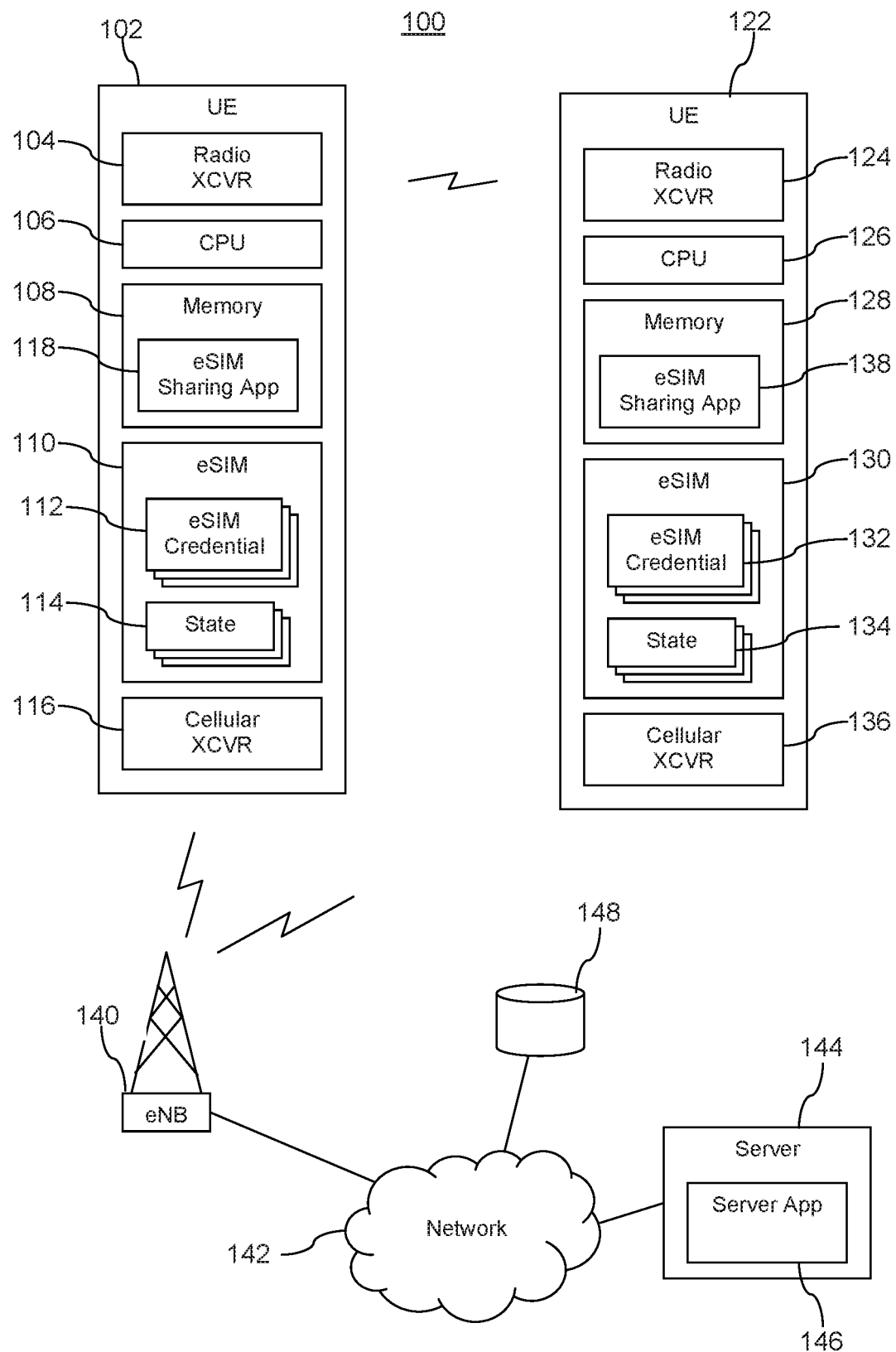
FIG. 1 is a block diagram of a communication system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

A user may wish to shift his or her wireless communication service from a first mobile communication device to a second mobile communication device. For example, a boating enthusiast may wish to shift his wireless service from his expensive smart phone to a cheap feature phone when taking the phone onto his boat. If the cheap feature phone falls in the lake, there is no great loss. After the boating enthusiast returns to shore, he can shift his wireless service back to his expensive smart phone. The "pop-and-swap" capability of traditional SIMs make this kind of ad hoc shifting of service from one device to another easy. The "pop-and-swap" capability of traditional SIMs is useful, also, when a wireless communication service subscriber has purchased a new phone and wishes to transfer his or her wireless communication service to the new phone. Future mobile communication devices, however, may not have a removable SIM but may instead have an embedded SIM (eSIM) that provides confidential information for authenticating into a radio access network (RAN) but that is not removable by the user. In an embodiment, the eSIM comprises wireless communication service provider data and wireless communication service subscriber data. Said in other words, one technological solution to a technical problem—replacing a removable SIM with an embedded eSIM to save space in a previously crowded mobile communication device package—has created a new technological problem—inability to share SIMs between different mobile communication devices (e.g., making "pop-and-swap" infeasible). The present disclosure teaches a system and method that provides a technical solution for the technical problem of transferring the eSIM credentials securely from a first mobile communication device to a second mobile communication and disabling the use of the eSIM credentials on the first device. It is thought that the present disclosure provides a more secure process of transferring authentication credentials from the eSIM of a first device to the eSIM of a second device than is provided by the traditional SIM pop-and-swap procedure.

A first mobile communication device establishes peer-to-peer wireless communication with a second mobile communication device, for example via Bluetooth wireless communication or via WiFi wireless communication. An eSIM sharing application installed on the first device communicates via the peer-to-peer wireless communication link to an eSIM sharing application installed on the second device. In an embodiment, the eSIM sharing application on the second device prompts a user of the second device to input a user code (e.g., a personal identification number—PIN). The user code may be associated with the single wireless communication service account and/or the eSIM credentials. The eSIM sharing application on the second device encrypts the input user code and sends the encrypted code to the eSIM sharing application on the first device. The eSIM sharing application on the first device decrypts the code and validates that the user code matches an authoritative value of the user code (e.g., a user code value stored with the other eSIM credentials). If the user code is validated by the eSIM sharing application on the first device, the eSIM credentials transfer continues and otherwise it stops. The validation of the user code provides a security step that deters a rogue second device having an eSIM sharing application attempting to hijack the eSIM credentials of the first device without consent of the authorized subscriber, thereby tending to make the eSIM transfer process more secure from electronic identity theft. In the pop-and-swap procedure associated with removable SIMs, there is no possible check on the authorization of the SIM swap—the user is not challenged to present confidential information to validate that he or she is authorized to swap the SIM. In an embodiment, the eSIM sharing application on the first device is stored in a system memory partition of the first device, and the eSIM sharing application on the second device is stored in a system memory partition of the second device, whereby the eSIM sharing applications are protected from attempts to hack, bypass, or subvert the protections of the eSIM sharing applications.

In an embodiment, during a first instance of eSIM credential transfer, the first device learns and stores the electronic identity (EID) of the second device, and the second device learns and stores the EID of the first device. The storing of the EIDs can streamline the future transferal of eSIM credentials as well as further securing the process of eSIM transferal. For example, in an embodiment, after a first eSIM credential transfer, the eSIM sharing applications may be configured to restrict eSIM credential transfers to a mobile communication device having an already known EID. Additionally, each communication message exchanged between the first and second device over the peer-to-peer wireless communication link may include the EID of the sending device as a further proof of authenticity. In an embodiment, the EIDs may be transmitted in an encrypted form. Alternatively, the message content may be encrypted.

The eSIM sharing application on the first device changes a state of the eSIM of the first device from an initial enabled state to a transfer-in-progress state. The eSIM sharing application on the first device transmits eSIM credentials to the eSIM sharing application on the second device. In one embodiment, the eSIM of the first device continues to store the eSIM credentials. In another embodiment, however, the eSIM sharing application of the first device deletes the eSIM credentials from the eSIM of the first device after transmitting the eSIM credentials to the eSIM sharing application on the second device. The process where the first device deletes the eSIM credentials after transmitting may be particularly suitable to the use case of replacing a first device by a second device (e.g., device upgrade). The eSIM sharing application on the second device stores the received eSIM credentials in the eSIM of the second device.

The eSIM sharing application on the first device changes the state of the eSIM of the first device from the transfer-in-progress state to a disabled-transferred state and transmits a disabled-transferred message to the second device. The eSIM sharing application on the second device changes the state of the eSIM of the second device to a disabled state. The user of the second device may be prompted by the eSIM sharing application on the second device to select using the transferred eSIM credentials. On receiving a user selection input, the eSIM sharing application on the second device changes the state of the eSIM of the second device from the disabled state to an enabled state. When the eSIM of the second device is in an enabled state, the second device is able to attach to the cellular radio access network and receive wireless communication service from the cellular service provider.

It is a benefit of the disclosed eSIM transfer system and method that only one mobile communication device is enabled to use the single set of eSIM credentials at any one time. This benefit is provided by the technological solution described above. More specifically, by controlling the state changes of the eSIMs of the associated mobile communication devices through a particular sequence of states by the collaboration of the eSIM sharing applications through the exchange of messages over a peer-to-peer wireless communication link, and by storing the eSIM sharing applications in a system partition of memory on the mobile communication devices, the business rule of providing wireless communication service to a single set of eSIM credentials on a single mobile communication device is enforced and subversion of this process by rogue devices is deterred. Because the eSIM transfer occurs via a peer-to-peer wireless link, in an embodiment, the eSIM transfer can be completed when out of cellular wireless coverage.

In an embodiment, the process of transferring the eSIM credentials from the first device to the second device can be reversed, and the eSIM credentials can be transferred from the second device back to the first device. In one example, the eSIM credentials are not deleted from the eSIM on the first device and hence need not be transferred from the second device back to the first device. Instead, in this embodiment, the ability to use the eSIM credentials is transferred from the second device to the first device by completing a specific sequence of state changes of the eSIM credentials based on messaging over a peer-to-peer wireless communication link between the two devices. In this case, the eSIMs on both devices retain the eSIM credentials, but only one of the devices is allowed to use the eSIM credentials at a time, as enforced by the predefined sequence of eSIM state transistions and peer-to-peer message exchanges.

In an embodiment, when a transfer of the right to use a set of eSIM credentials has been completed, the enabled device sends a report to a network server that maintains a record of a current association between the set of eSIM credentials and a device identity, for example an EID. In an embodiment, when a transfer of the right to use a set of eSIM credentials has been completed, both the enabled device and the device that has just transferred the right to use the set of eSIM credentials send a report of the eSIM credentials transfer to the network server, whereby the network server can ensure that the proper hand-off of the credentials has occurred. The message(s) send by the device(s) may be transmitted from eSIM sharing application(s) including a private key stored in the eSIM sharing application(s), whereby the network server may determine that the message(s) is authorized. This network server may work with other network nodes, for example media gateways and/or cell sites, to assure that only the mobile communication device associated with the registered EID is able to obtain cellular wireless communication service. Said in other words, the network server may interwork with media gateways and/or cell sites to ensure that only one mobile communication device can use a set of eSIM credentials at a time. This may be viewed as a redundant security that operates independently of the eSIM sharing procedure described above—a kind of "belt AND suspenders" approach to managing access to the radio access network using the eSIM credentials.

In another embodiment, after the first device has transferred the eSIM credentials to the second device, the eSIM sharing application on the first device deletes the eSIM credentials from the eSIM. In this case, the eSIM credentials are transferred back to the first device, and then the eSIM credentials are deleted from the eSIM of the second device. Thus, in this other embodiment, only one device stores the eSIM credentials in its eSIM at a time, with the possible exception of the brief period of time during which the eSIM transfer process is taking place. This approach of deleting the eSIM credentials from the first device may be more suitable in the scenario where a subscriber is replacing an old device with a new device. This approach may be preferred by some wireless service providers as being inherently more secured than storing the same set of eSIM credentials on a plurality of different devices.

In an embodiment, the eSIM sharing application is installed in a system memory partition of the mobile communication device and is considered to be inherently trusted (e.g., relatively immune to attempts to subvert and bypass its restrictions). For example, an operating system of the mobile communication device may restrict access to the system memory partition to users who provide a password known only to the original equipment manufacturer (OEM) or to the wireless communication service provider. The eSIM sharing application enforces the business constraint that only one mobile communication device is authorized to use the eSIM credentials at one time.

In addition to the security gained by placing the eSIM sharing application in the system partition, further security from fraud and tampering is attained by conducting the eSIM credential transfer over a peer-to-peer wireless communication link. These communication links are relatively short range, thereby reducing the risk that another device might hijack the eSIM credentials during an eSIM credential transfer procedure. Additionally, the use of a user code that is known only to the subscriber associated with the wireless service account further reduces the exposure to fraud and credential hijacking. As yet a further layer of security, the peer-to-peer wireless link may be manually initiated by the user of the mobile communication device, thereby obviating the ability of a hacker to initiate a hack at a time of his own choosing. Further security may be provided by passing the EID of the devices in the messages that are transmitted between the devices. Further security may be provided by encrypting the messages that are transmitted between the devices.

Turning now to FIG. 1, a communication system 100 is described. In an embodiment, the system 100 comprises a first mobile communication device 102 and a second mobile communication device 122. The first device 102 may be a mobile phone, a smart phone, a personal digital assistant (PDA), a headset computer, a wearable computer, a laptop computer, a notebook computer, or a table computer. The second device may a mobile phone, a smart phone, a personal digital assistant (PDA), a headset computer, a wearable computer, a laptop computer, a notebook computer, or a table computer. In an embodiment, the first device 102 and the second device 122 may be different types of device. For example, in an embodiment, the first device 102 may be a mobile phone and the second device 122 may be a smart phone. For example, in an embodiment, the first device 102 may be a mobile phone and the second device 122 may be a laptop computer.

The first mobile communication device (user equipment—UE) 102 comprises a short-range radio transceiver 104, a processor 106, a memory 108, an electronic subscriber identity module (eSIM) 110 storing one or more sets of eSIM credentials 112 and storing one or more eSIM state registers 114, and a cellular radio transceiver 116. In an embodiment, the number of different sets of eSIM credentials 112 in the eSIM 110 is the same as the number of eSIM state registers 114. In an embodiment, the eSIM 110 is configured to store up to five different sets of eSIM credentials 112 and up to five different eSIM state registers 114.

The second mobile communication device (UE) 122 comprises a short range radio transceiver 124, a processor 126, a memory 128, an electronic subscriber identity module (eSIM) 130 storing one or more sets of eSIM credentials 132 and storing an eSIM state register 134, and a cellular radio transceiver 136. The memory 108 comprises a non-transitory portion that comprises an eSIM sharing application 118; and the memory 128 comprises a non-transitory portion that comprises an eSIM sharing application 138. The system 100 further comprises a cell site 140, a network 142, a computer system (e.g., a server) 144 that executes a server application 146, and a data store 148. The UEs 102, 122 are able to communicate with the network 142 via the cell site 140.

The cell site 140 and at least a portion of the network 142 provides wireless communication service according to at least one of a long term evolution (LTE), as code division multiple access (CDMA), or a global system for mobile communications (GSM) telecommunication protocol. The network 142 comprises one or more public networks, one or more private networks, or a combination thereof. While a single cell site 140 is shown in FIG. 1, it is understood that the system 100 may comprise any number of cell sites 140. While two mobile communication devices 102, 122 are shown in FIG. 1, it is understood that the system 100 may comprise any number of mobile communication devices.

The UE 102, 122 may exchange messages with the cell site 140 to authenticate into a radio access network (RAN) and to receive cellular wireless communication service from the cell site 140 and/or other cell sites. Part of the authentication processes comprises the UE 102, 122 providing at least some of the eSIM credentials 112, 132 to the cell site 140. In an embodiment, the eSIM credentials 112, 132 comprise wireless communication service provider data and wireless communication service subscriber data. In an embodiment, a set of eSIM credentials 112, 132 comprises one or more of a universal integrated circuit card identifier (ICCID), an international mobile subscriber identity (IMSI), mobile station integrated service digital network identity (MSISDN), and/or mobile dialing number (MDN). The eSIM credentials 112, 132 may comprise one or more network authentication values, credentials, and keys, for example a Ki value. In an embodiment, the eSIM 110 may comprise a plurality of different sets of eSIM credentials 112, one set of eSIM credentials 112 for each of a plurality of different wireless communication service lines or different wireless communication service providers.

In an embodiment, the eSIM 110, 130 may further comprise applications for attaching to different networks. In an embodiment, the eSIM 110, 130 may further comprise applications for pairing, locking, provisioning, and other activities. The eSIM 110, 130 may comprise a mobile username and a mobile Internet Protocol (IP) password. The eSIM 110, 130 may comprise a domain name. In an embodiment, a set of eSIM credentials 112 may be about 100 kbytes in size to about 200 kbytes in size. In another embodiment, the eSIM credentials 112 may be about 75 kbytes in size to about 500 kbytes in size.

The first UE 102 and the second UE 122 may be proximate to each other, for example within 50 feet of each other. In some cases, the first UE 102 and the second UE 122 may be within 5 feet of each other, for example both UEs 102, 122 may be lying on a desk in a home. A user may invoke a user interface of the first UE 102 to establish a short-range wireless communication link between the short-range radio transceiver 104 of the first UE 102 and the short-range radio transceiver of the second UE 122, for example a Bluetooth radio communication link or a WiFi radio communication link. While the short-range radio communication link is established between the two UEs 102, 122, the eSIM sharing applications 118, 138 may collaborate with each other to transfer the eSIM credentials 112, 132 (or the authority to make use of the eSIM credentials 112, 132) from one to the other of the UEs 102, 122.

In an example, short-range radio communication between the short-range radio transceivers 104, 124 may be limited to a maximum range of 1000 feet. In an example, short-range radio communication between the short-range radio transceivers 104, 124 may be limited to a maximum range of 200 feet. In an example, short range-radio communication between the short-range radio transceivers 104, 124 may be limited to a maximum range of 100 feet. In an example, short range-radio communication between the short-range radio transceivers 104, 124 may be limited to a maximum range of 50 feet. It is a benefit taught by the current disclosure that the short-range nature of the peer-to-peer communication link between the UEs 102, 122 contributes to the security of the transfer of eSIM credentials between the UEs 102, 122. To corrupt the transfer of eSIM credentials, a malefactor would need to be relatively close to one or both of the UEs 102, 122. Because the transfer of eSIM credentials may occur at random times, it becomes impracticable to spoof the transfer of eSIM credentials. The system 100 disclosed herein further contemplates additional security measures to thwart hijacking of eSIM credentials by malefactors, but it is noted that the short range radio communication link used in the transferal of eSIM credentials adds its own layer of threat reduction.

Figure 2:
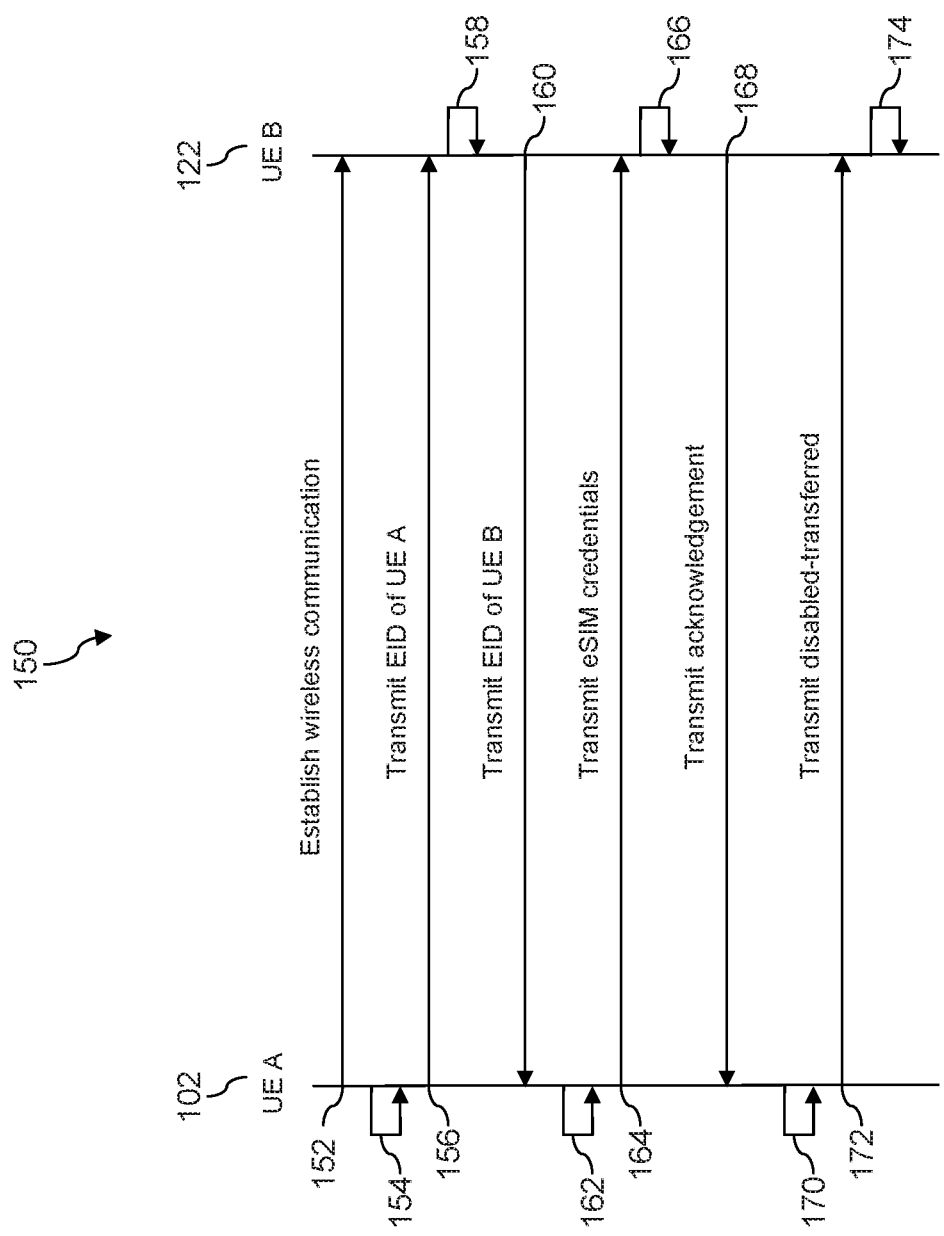
FIG. 2 is a message sequence diagram of a peer-to-peer eSIM transfer according to an embodiment of the disclosure.

Turning now to FIG. 2, a message sequence 150 is described. In an embodiment, the message sequence 150 may be used to transmit the eSIM credentials 112 from the first UE 102 to the second UE 122 and to transfer use of the wireless communication service from the first UE 102 to the second UE 122. At label 152, the first UE 102 initiates and establishes short-range peer-to-peer wireless communication link with the second UE 122. For example, the short-range radio transceiver 104 establishes a peer-to-peer wireless communication link with the short-range radio transceiver 124. The peer-to-peer wireless communication link may be a Bluetooth wireless communication link. The peer-to-peer wireless communication link may be a WiFi wireless communication link. The peer-to-peer wireless communication link may be a near field communication (NFC) wireless communication link. A user of the first UE 102 may initiate the short-range peer-to-peer wireless communication using a conventional interface of the first UE 102, for example to pair with another Bluetooth device or to establish the first UE 102 as a WiFi hotspot. The term peer-to-peer is used to indicate that the short-range radio transceiver 104 wirelessly communicates directly to the short-range radio transceiver 124, without the mediation of a wireless relay, a wireless access point, or a cell site.

At label 154, the user of the first UE 102 initiates transfer of the eSIM credentials 112 to the second UE 122. The user at label 154 may activate the eSIM sharing application 118 by selecting an icon, widget, or other control on a display screen of the UE 102. At label 156, the eSIM sharing application 118 transmits the equipment identifier (EID) of the first UE 102 via the peer-to-peer wireless communication link to the second UE 122. In an embodiment, the transmission of the EID by the eSIM sharing application 118 to the second UE 122 triggers the execution of the eSIM sharing application 138 on the second UE 122. At label 158, the eSIM sharing application 138 prompts the user of the second UE 122 to input a user code (e.g., a personal identification number—PIN). Note that the user of the second UE 122 may be the same human being as the user of the first UE 122, for example the same human being may provide inputs to the two UEs 102, 122 during the eSIM credential transfer process. At label 160, the eSIM sharing application 138 transmits the EID of the second UE 122 and the user code entered by the user to the first UE 102 via the peer-to-peer wireless communication link. Alternatively, the eSIM sharing application 138 does not transmit the user code with the EID of the second UE 122 to the first UE 102, and instead the eSIM sharing application 138 validates the user code itself.

At label 162, the eSIM sharing application 118 validates the user code received from the second UE 122 (e.g., when the eSIM sharing application 138 does not validate the user code). For example, the eSIM sharing application 118 may look up an authoritative copy of the user code in a non-transitory portion of the memory 108. For example, the eSIM sharing application 118 may look up the authoritative copy of the confirmation in the eSIM credentials 112. For example, the eSIM sharing application 118 may request the authoritative copy of the user code from the server application 146 via the cell site 140 via the network 142. The eSIM sharing application 118 validates the received user code by comparing its value to the value of the authoritative copy of the user code. If the values match, the user code is deemed validated, and the eSIM credential transfer proceeds. If the values disagree, the user code is deemed invalid, and the eSIM credential transfer aborts.

If the user code received from the second UE 122 is validated, the eSIM sharing application 118 changes the eSIM state register 114 of the eSIM 110 from an enabled state to a transfer-in-progress state. At label 164 the eSIM sharing application 118 transmits a copy of the eSIM credentials 112 to the second UE 122 via the peer-to-peer wireless communication link. At this point in the eSIM credential transfer process, neither the first UE 102 nor the second UE 122 is able to communicate conventionally via the cell site 140 (a possible exception may be placing emergency calls via an E911 facility of the radio access network).

At label 166, the eSIM sharing application 138 prompts the user of the second UE 122 to accept the transfer of the eSIM credentials. If the user selects to accept the transfer of the eSIM credentials, the eSIM sharing application 138 stores the received copy of the eSIM credentials in the eSIM credentials 132 of the eSIM 130. At label 166, and before the eSIM sharing application 138 prompts the user to accept transfer, the eSIM sharing application may extract an EID value sent in the message containing the eSIM credentials sent by the eSIM sharing application 118 and validate that the EID value matches the EID of the first device 102 received at label 156. If the EID value does not match the EID of the first device 102, the eSIM sharing application 138 may truncate the transfer of eSIM credentials and/or send an error message to the first device 102.

At label 168, the eSIM sharing application 138 transmits an acknowledgement via the peer-to-peer wireless communication link to the first UE 102. At label 170, in response to receiving the acknowledgement, the eSIM sharing application 118 changes the eSIM state register 114 of the eSIM 110 to a disabled-transferred state. At label 172, the eSIM sharing application 118 transmits a disabled-transferred message via the peer-to-peer wireless communication link to the second UE 122. At label 174, the eSIM sharing application may extract an EID value sent in the disabled-transferred message and validate that the EID value matches the EID of the first device 102 received at label 156. If the EID value does not match the EID of the first device 102, the eSIM sharing application 138 may truncate the transfer of eSIM credentials and/or send an error message to the first device 102. At label 174, the eSIM sharing application 138 changes the eSIM state register 134 of the eSIM 130 to a disabled state. Also at label 174, the eSIM sharing application 138 prompts the user of the second UE 122 to select using the transferred eSIM credentials (e.g., select the second device for transfer of the eSIM credentials and to use the second device for cellular wireless communication). If the user input selects the transferred eSIM credentials, the eSIM sharing application 138 changes the eSIM state register 134 of the eSIM 130 to an enabled state, and the user is then able to use the second UE 122 to communicate via the cell site 140 or other cell sites with the network 142. The wireless communication service has effectively been transferred from the first UE 102 to the second UE 122.

It is noted that after the label 160, the exchange of messages between the devices 102, 122 may include EID values of the receiving device as a further assurance of security. Additionally, at least some of the messages exchanged between the devices 102, 122 may be encrypted, may be exchanged via secure socket layer (SSL) procedures, or may be exchanged using transport layer security (TLS) procedures. In embodiment, after the user of the second UE 122 selects using the transferred eSIM credentials at label 174, the eSIM sharing application 138 of the second UE 122 sends a message to the server 144 and/or the server application 146, wherein the message reports that the eSIM credentials are now associated to the second UE 122, whereby the network server 144 is enabled to ensure that only one mobile communication device can use the eSIM credentials at a time.

Figure 3:
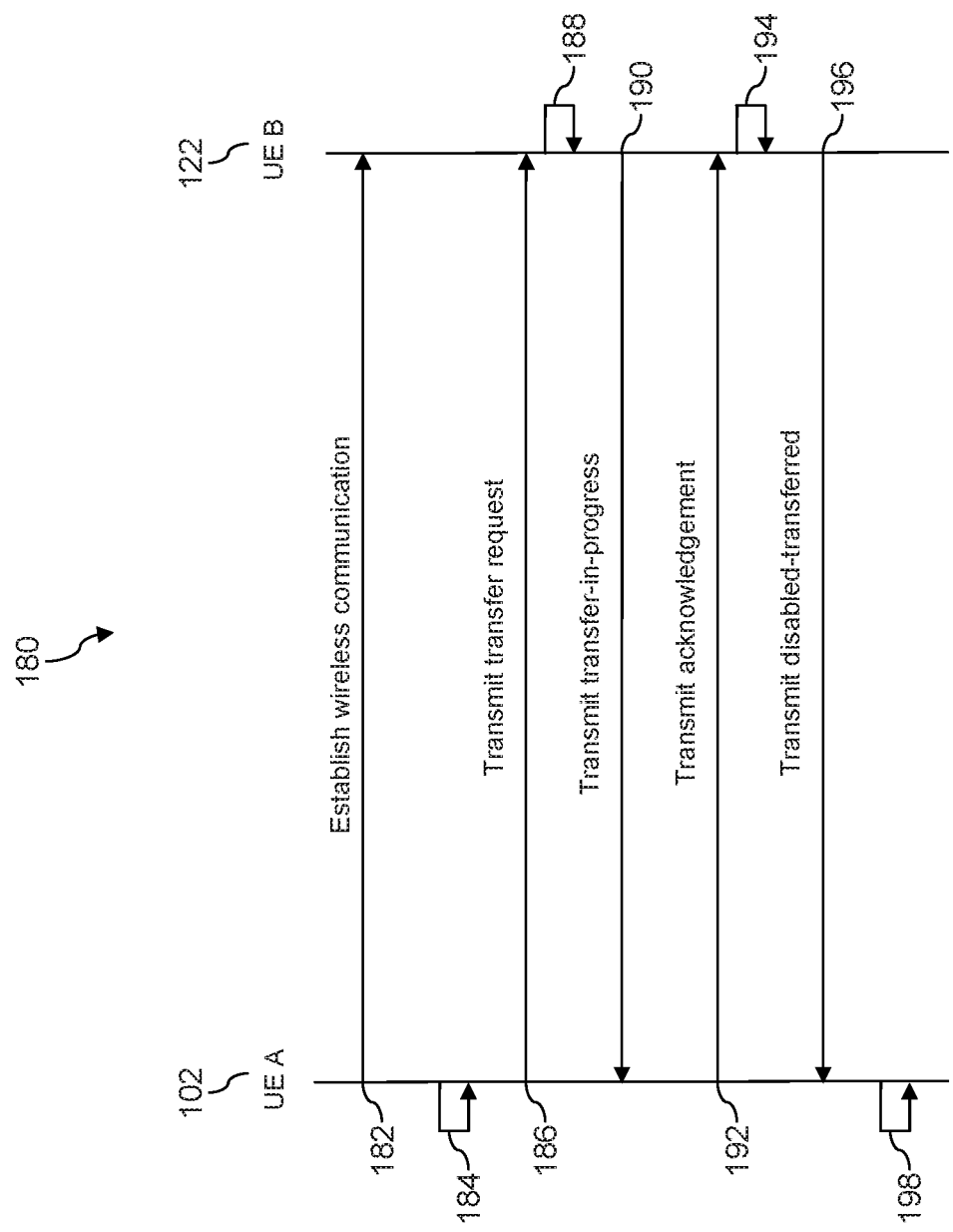
FIG. 3 is a message sequence diagram of another peer-to-peer eSIM transfer according to an embodiment of the disclosure.

Turning now to FIG. 3, a message sequence 180 is described. In an embodiment, the message sequence 180 may be used to transfer the use of the eSIM credentials 112, 132 from the second UE 122 back to the first UE 102. A precondition of the process depicted by the message sequence 180 is that the eSIM credentials are stored in both the eSIM credentials 112 of the eSIM 110 and the eSIM credentials 132 of the eSIM 130. This may be the configuration of the UEs 102, 122 after a first transfer of the eSIM credentials (e.g., after the process illustrated in and described with reference to FIG. 2 above).

At label 182, the first UE 102 establishes a peer-to-peer wireless communication link with the second UE 122. This wireless link may be established in any of the ways described above with reference to label 152 and FIG. 2. At label 184, the user of the first UE 102 launches the eSIM sharing application 118 and selects an input in a user interface presented on a display of the first UE 102 to request to use a particular set of eSIM credentials 112. In an embodiment, the eSIM 110 may store a plurality of sets of eSIM credentials 112, where each different set of eSIM credentials are associated with a different wireless communication service line.

At label 186, the eSIM sharing application 118 transmits an eSIM credentials transfer request via the peer-to-peer wireless communication link to the second UE 122. In an embodiment, the eSIM sharing application 118 includes the EID of the second UE 122 in the eSIM credentials transfer request message, whereby to invoke the eSIM sharing application 138 on the second UE 122. At label 188, the eSIM sharing application 138 prompts the user of the second UE 122 to approve transfer of the use of the eSIM credentials 112, 132 to the first UE 102. Note that in the configuration depicted in FIG. 3, both the UE 102 and the UE 122 store the same eSIM credentials. The eSIM 110 of the first UE 102 stores the eSIM credentials 112, and the eSIM 130 of the second UE 122 stores the eSIM credentials 132. Only one of the UEs 102, 122, however, is authorized to use the eSIM credentials at any time. This business restriction is enforced by the eSIM sharing application 118 on the first UE 102 and by the eSIM sharing application 138 on the second UE 122. If the user of the second UE 122 selects to approve transfer of the use of the eSIM credentials 112, 132 to the first UE 102, the eSIM sharing application 138 prompts the user to enter the user code on the second UE 122. The eSIM sharing application 138 changes the eSIM state register 134 of the eSIM 130 on the second UE 122 to a disabled-in-progress state.

At label 190, the eSIM sharing application 138 transmits an eSIM transfer-in-progress message via the peer-to-peer wireless communication link to the first UE 102. At label 192, the eSIM sharing application 118 transmits an acknowledgement message to the second UE 122. At label 194, the eSIM sharing application 138 changes the eSIM state register 134 of the eSIM 130 on the second UE 122 to a disabled-transferred state. At label 196, the eSIM sharing application 138 transmits a disabled-transferred message via the peer-to-peer wireless communication link to the first UE 102. At label 198, the eSIM sharing application 118 changes the eSIM state register 114 of the eSIM 110 to a disabled state. The eSIM sharing application 118 prompts the user to select to use the eSIM credentials 112 on the first UE 102. After the user selects to use the eSIM credentials 112 on the first UE 102, the eSIM sharing application 118 changes the eSIM state register 114 of the eSIM 110 to an enabled state, and the first UE 102 is enabled to engage in cellular wireless communication using the eSIM credentials 112.

It is noted that the exchange of messages between the devices 102, 122 may include EID values of the receiving device as a further assurance of security. Additionally, at least some of the messages exchanged between the devices 102, 122 may be encrypted, may be exchanged via secure socket layer (SSL) procedures, or may be exchanged using transport layer security (TLS) procedures. In embodiment, after the user of the first UE 102 selects using the transferred eSIM credentials at label 198, the eSIM sharing application 118 of the first UE 102 sends a message to the server 144 and/or the server application 146, wherein the message reports that the eSIM credentials are now associated to the first UE 102, whereby the network server 144 is enabled to ensure that only one mobile communication device can use the eSIM credentials at a time.

Figure 4:
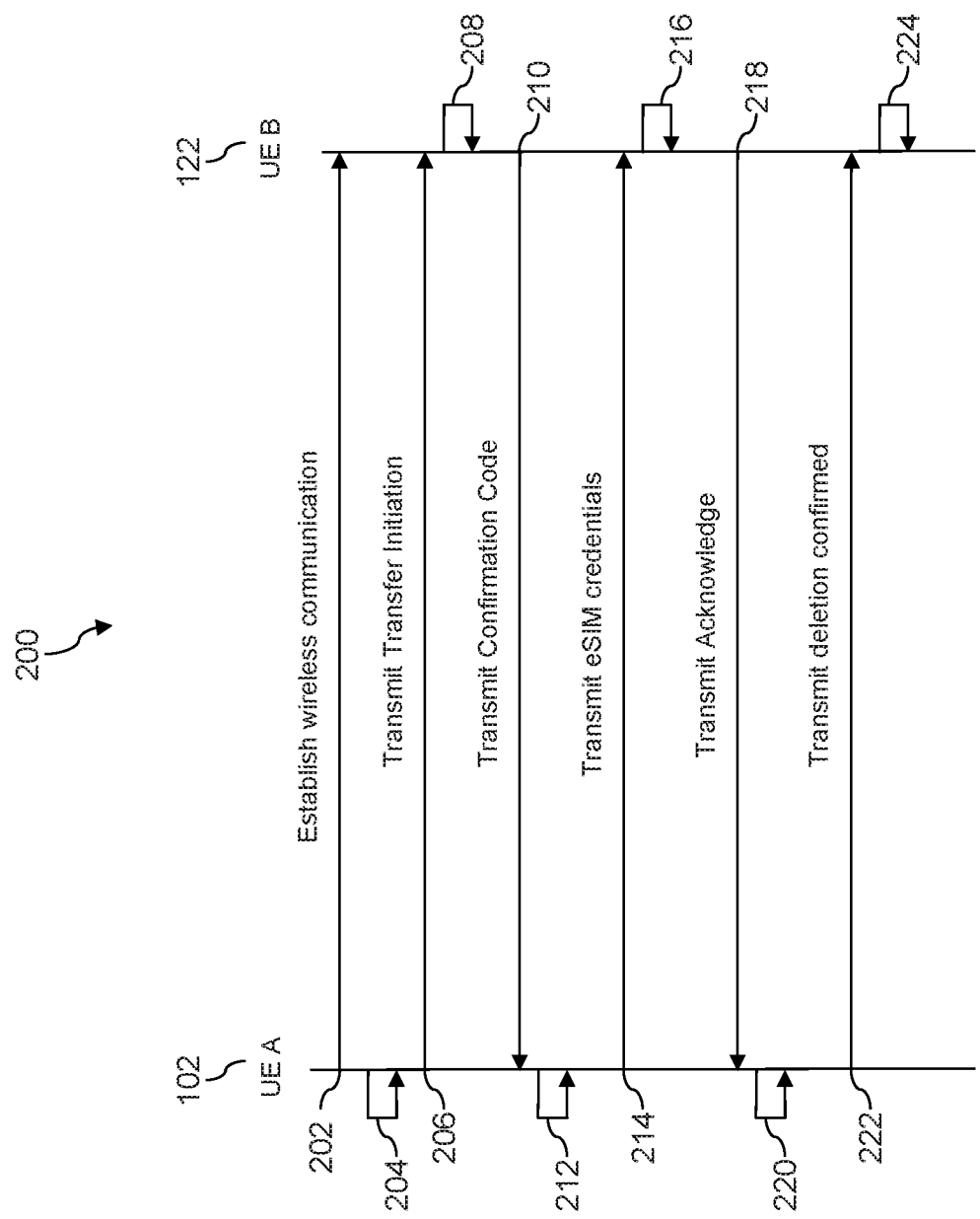
FIG. 4 is a message sequence diagram of yet another peer-to-peer eSIM transfer according to an embodiment of the disclosure.

Turning now to FIG. 4, a message sequence 200 is described. In an embodiment, the message sequence 200 may be used to copy the eSIM credentials 112 from the first UE 102 to the eSIM credentials 132 of the eSIM 130 of the second UE 122, to delete the eSIM credentials 112 from the eSIM 110 of the first UE 102, and to enable the second UE 122 to conduct cellular communications via the cell site 140 and the RAN using the eSIM credentials 132. At label 202, the first UE 102 initiates and establishes a short-range peer-to-peer wireless communication link with the second UE 122. The peer-to-peer wireless communication link may be established in any of the ways described above with reference to label 152 and FIG. 2.

At label 204, the eSIM sharing application 118 is invoked and launched on the first UE 102. The eSIM sharing application 118 prompts the user to initiate transfer of the eSIM credentials 112 from the first UE 102 to the second UE 122. At label 206, the eSIM sharing application 118 transmits an eSIM transfer initiation message via the peer-to-peer wireless communication link to the second UE 122. At label 208, the eSIM sharing application 138 prompts the user to input the user code. At label 210, the eSIM sharing application 138 transmits the user code via the peer-to-peer wireless communication link to the first UE 102.

At block 212, the eSIM sharing application 118 validates the user code received from the second UE 122. For example, the eSIM sharing application 118 may look up an authoritative copy of the user code in a non-transitory portion of the memory 108. For example, the eSIM sharing application 118 may look up the authoritative copy of the user code in the eSIM credentials 112. For example, the eSIM sharing application 118 may request the authoritative copy of the user code from the server application 146 via the cell site 140 via the network 142. The eSIM sharing application 118 validates the received user code by comparing its value to the value of the authoritative copy of the user code. If the values match, the user code is deemed validated, and the eSIM credential transfer proceeds. If the values disagree, the conformation code is deemed invalid, and the eSIM credential transfer aborts. At label 212, if the user code is validated, the eSIM sharing application 118 sets the eSIM state register 114 of the eSIM 110 to a transfer-in-progress state.

At label 214, the eSIM sharing application 118 transmits the eSIM credentials 112 via the peer-to-peer wireless communication link to the second UE 122. At label 216, the eSIM sharing application 138 prompts the user to select acceptance of the transfer of the eSIM credentials 112 in the user interface of the second UE 122. The eSIM sharing application 138 stores the eSIM credentials from the first UE 102 in the eSIM credential 132 of the eSIM 130 of the second UE 122. At label 218, the eSIM sharing application 138 transmits an acknowledge message to the first UE 102. At label 220, the eSIM sharing application 118 deletes the eSIM credentials 112 from the eSIM 110 of the first UE 102. At label 222, the eSIM sharing application 118 transmits a deletion confirmed message via the peer-to-peer wireless communication link to the second UE 122. At label 224, the eSIM sharing application 138 changes the eSIM state register 134 of the eSIM 130 of the second UE 122 to a disabled state. The eSIM sharing application 138 prompts the user to select to use the eSIM credentials 132. If the user selects to use the eSIM credentials 132, the eSIM sharing application 138 changes the eSIM state register 134 of the eSIM 130 of the second UE 122 to an enabled state, and the user is then able to use the second UE 122 to communicate via the cell site 140 or other cell sites in the RAN with the network 142. The wireless communication service has effectively been transferred from the first UE 102 to the second UE 122.

It is noted that the exchange of some of the messages between the devices 102, 122 may include EID values of the receiving device as a further assurance of security. Additionally, at least some of the messages exchanged between the devices 102, 122 may be encrypted, may be exchanged via secure socket layer (SSL) procedures, or may be exchanged using transport layer security (TLS) procedures. In embodiment, after the user of the second UE 122 selects using the transferred eSIM credentials, the eSIM sharing application 130 of the second UE 122 sends a message to the server 144 and/or the server application 146, wherein the message reports that the eSIM credentials are now associated to the second UE 122, whereby the network server 144 is enabled to ensure that only one mobile communication device can use the eSIM credentials at a time.

Figure 5:
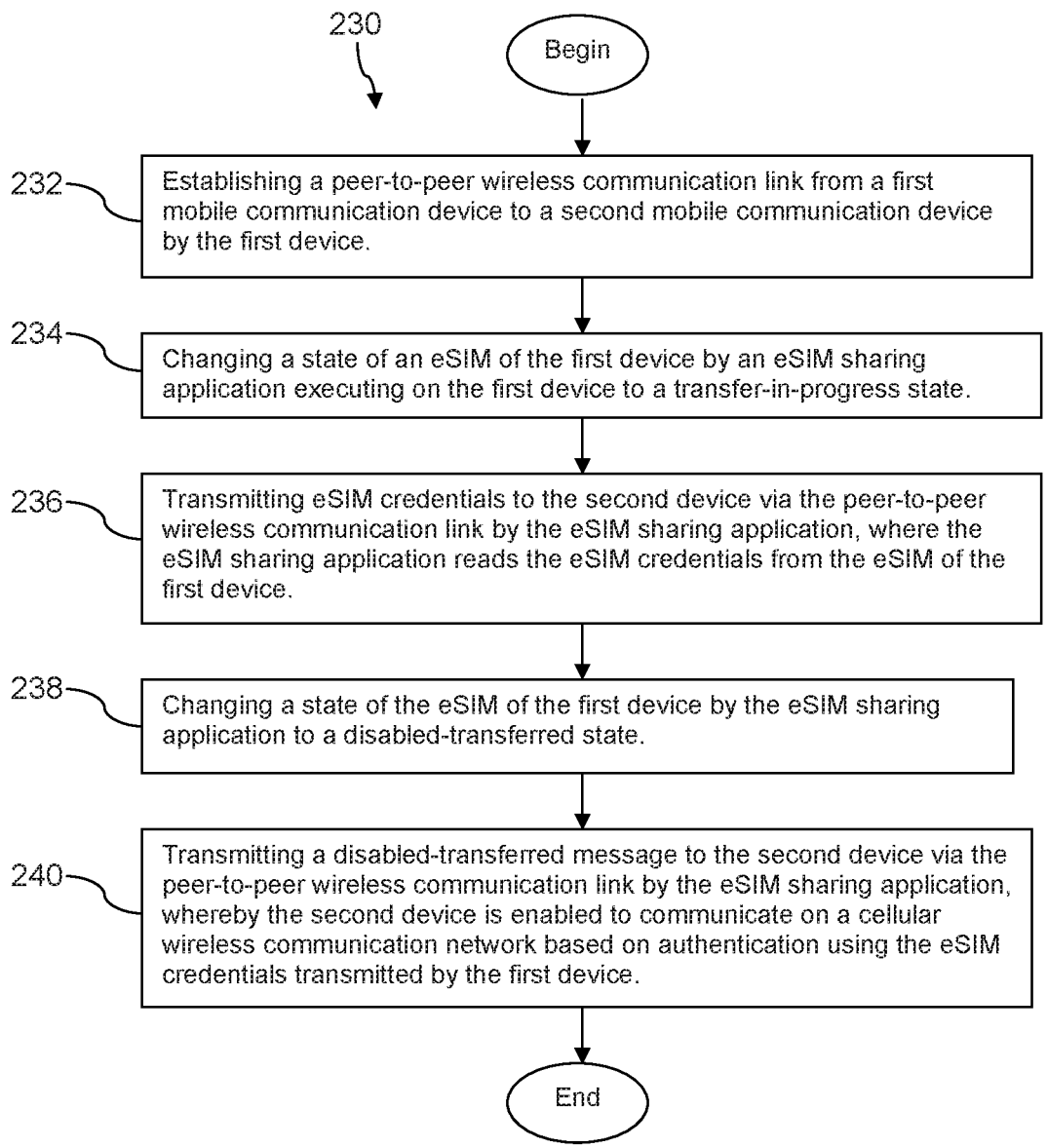
FIG. 5 is a flow chart of a method of peer-to-peer eSIM transfer according to an embodiment of the disclosure.

Turning now to FIG. 5, a method 230 is described. In an embodiment, the method 230 is a method of sharing electronic subscriber identity module (eSIM) credentials between two mobile communication devices. At block 232, the method 230 comprises establishing a peer-to-peer wireless communication link from a first mobile communication device to a second mobile communication device by the first device.

At block 234, the method 230 comprises changing a state of an eSIM of the first device by an eSIM sharing application executing on the first device to a transfer-in-progress state. At block 236, the method 230 comprises transmitting eSIM credentials to the second device via the peer-to-peer wireless communication link by the eSIM sharing application, where the eSIM sharing application reads the eSIM credentials from the eSIM of the first device.

At block 238, the method 230 comprises changing a state of the eSIM of the first device by the eSIM sharing application to a disabled-transferred state. At block 240, the method 230 comprises transmitting a disabled-transferred message to the second device via the peer-to-peer wireless communication link by the eSIM sharing application, whereby the second device is enabled to communicate on a cellular wireless communication network based on authentication using the eSIM credentials transmitted by the first device.

In an embodiment, method 230 further comprises transmitting a message to a network server by the second mobile communication device, wherein the message reports that the eSIM credentials are now associated to the second mobile communication device, whereby the network server is enabled to ensure that only one mobile communication device can use the eSIM credentials at a time. In an embodiment, method 230 further comprises maintaining records of associations between eSIM credentials and device identities by the network server based on messages received from mobile communication devices reporting the associations and interworking with a media gateway or a cell site by the network server to ensure that only one mobile communication device can use the eSIM credentials at a time.

Figure 6A:
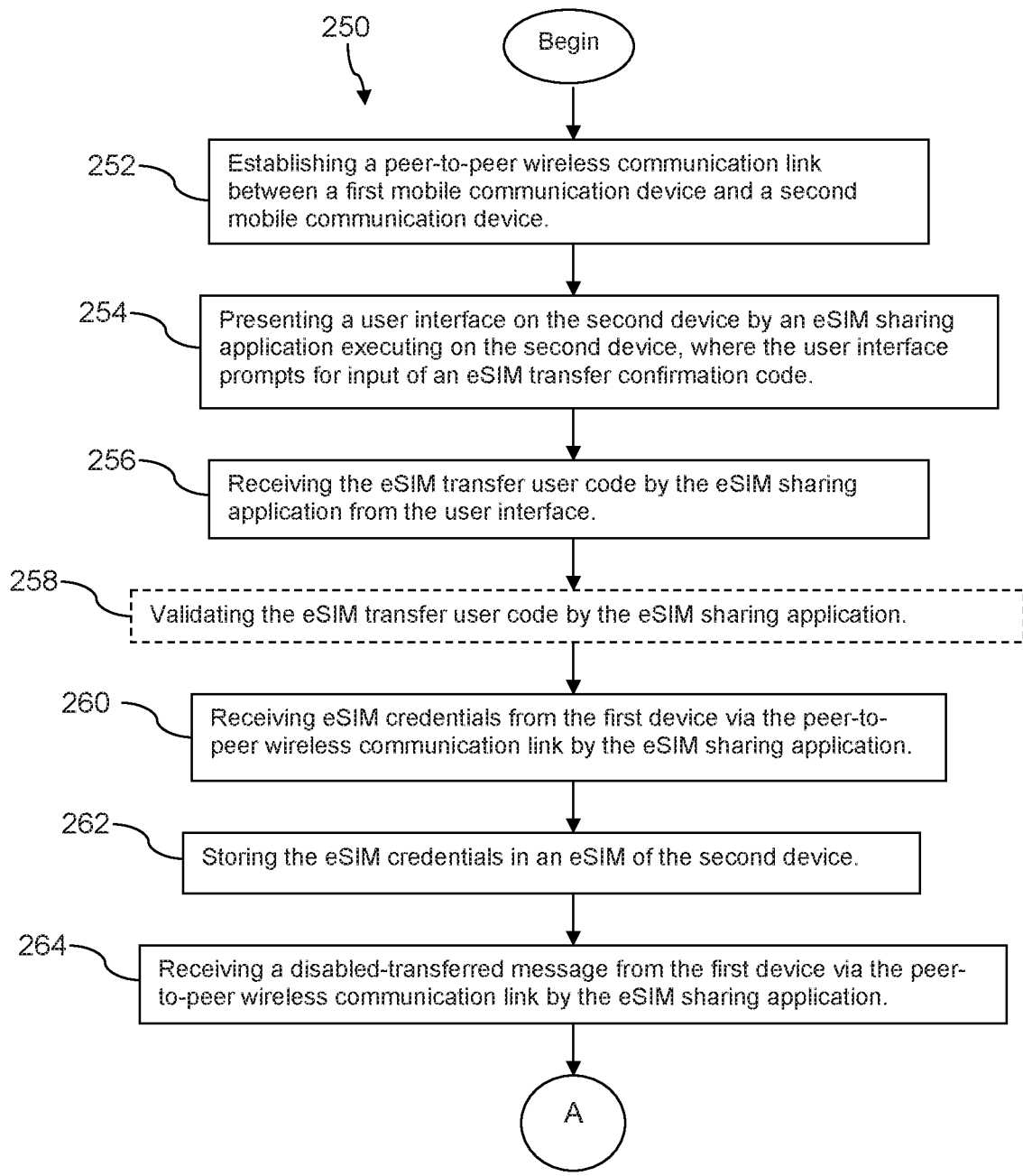
FIG. 6A and FIG. 6B are a flow chart of another method of peer-to-peer eSIM transfer according to an embodiment of the disclosure.
Figure 6B:
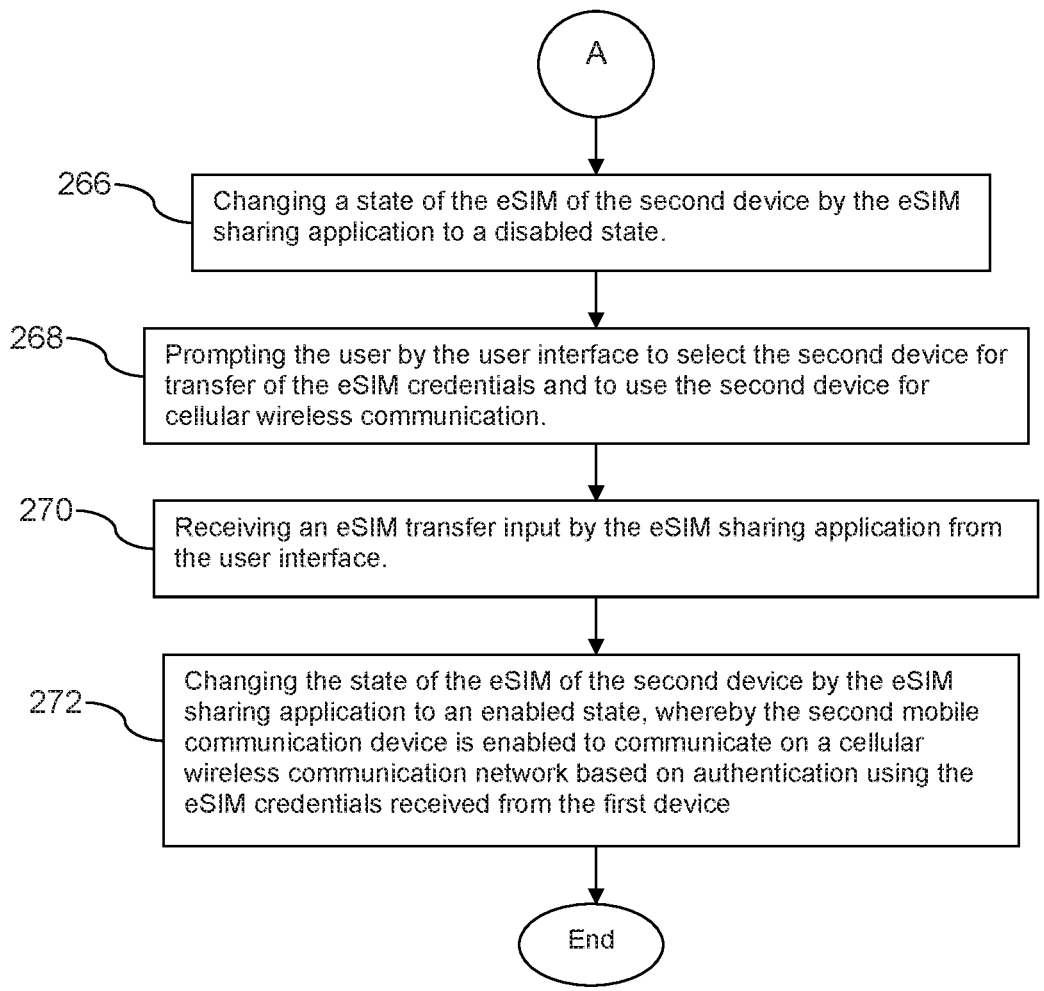

Turning now to FIG. 6A and FIG. 6B, a method 250 is described. In an embodiment, the method 250 is a method of sharing electronic subscriber identity module (eSIM) credentials between two mobile communication devices. The method 250 may be performed by the second of the two mobile communication devices. At block 252, the method 250 comprises establishing a peer-to-peer wireless communication link between a first mobile communication device and a second mobile communication device. At block 254, the method 250 comprises presenting a user interface on the second device by an eSIM sharing application executing on the second device, where the user interface prompts for input of an eSIM transfer user code.

At block 256, the method 250 comprises receiving the eSIM transfer user code by the eSIM sharing application from the user interface. At block 258, in an embodiment, the method 250 comprises validating the eSIM transfer user code by the eSIM sharing application. Alternatively, in another embodiment, the eSIM transfer user code may be transmitted by the second device via the peer-to-peer wireless communication link to the first device, and the first device may validate the eSIM transfer user code. Thus, block 256 may be considered optional (e.g., the validation may not be done as part of method 250, which is performed by the second device). In an embodiment, the method 250 may comprise transmitting an equipment identity number (EID) of the second device 122 via the peer-to-peer wireless communication link by the eSIM sharing application 138 to the first device 102 and receiving an EID of the first device 102 via the peer-to-peer wireless communication link by the eSIM sharing application 138 from the first device 102. After the exchange of respective EIDs, messages exchanged between the devices 102, 122 may comprise the sending device's EID, and the receiving device may compare the received EID value against a stored EID value to validate the received message.

At block 260, the method 250 comprises receiving eSIM credentials from the first device via the peer-to-peer wireless communication link by the eSIM sharing application. At block 262, the method 250 comprises storing the eSIM credentials in an eSIM of the second device.

At block 264, the method 250 comprises receiving a disabled-transferred message from the first device via the peer-to-peer wireless communication link by the eSIM sharing application. At block 266, the method 250 comprises changing a state of the eSIM of the second device by the eSIM sharing application to a disabled state. At block 268, the method 250 comprises prompting the user by the user interface to select the second device for transfer of the eSIM credentials and to use the second device for cellular wireless communication.

At block 270, the method 250 comprises receiving an eSIM transfer input by the eSIM sharing application from the user interface. At block 272, the method 260 comprises changing the state of the eSIM of the second device by the eSIM sharing application to an enabled state, whereby the second device is enabled to communicate on a cellular wireless communication network based on authentication using the eSIM credentials received from the first device.

In an embodiment, method 250 further comprises transmitting a message to a network server by the second mobile communication device, wherein the message reports that the eSIM credentials are now associated to the second mobile communication device, whereby the network server is enabled to ensure that only one mobile communication device can use the eSIM credentials at a time. In an embodiment, method 250 further comprises maintaining records of associations between eSIM credentials and device identities by the network server based on messages received from mobile communication devices reporting the associations and interworking with a media gateway or a cell site by the network server to ensure that only one mobile communication device can use the eSIM credentials at a time.

Figure 7:
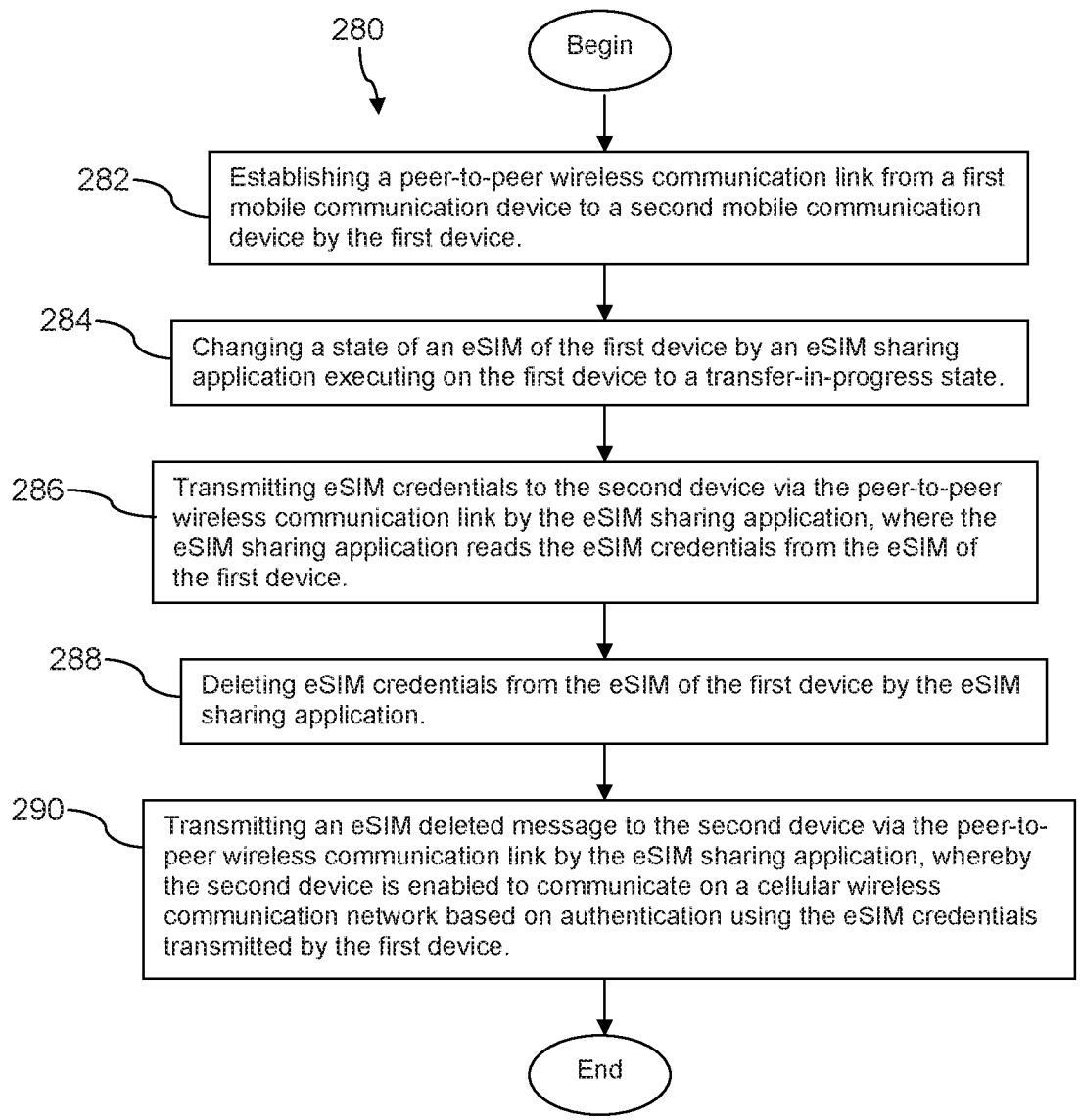
FIG. 7 is a flow chart of yet another method of peer-to-peer eSIM transfer according to an embodiment of the disclosure.

Turning now to FIG. 7, a method 280 is described. In an embodiment, the method 280 is a method of sharing electronic subscriber identity module (eSIM) credentials between two mobile communication devices. At block 282, the method 280 comprises establishing a peer-to-peer wireless communication link from a first mobile communication device to a second mobile communication device by the first device. At block 284, the method 280 comprises changing a state of an eSIM of the first device by an eSIM sharing application executing on the first device to a transfer-in-progress state.

At block 286, the method 280 comprises transmitting eSIM credentials to the second device via the peer-to-peer wireless communication link by the eSIM sharing application, where the eSIM sharing application reads the eSIM credentials from the eSIM of the first device. At block 288, the method 280 comprises deleting eSIM credentials from the eSIM of the first device by the eSIM sharing application. At block 290, the method 280 comprises transmitting an eSIM deleted message to the second device via the peer-to-peer wireless communication link by the eSIM sharing application, whereby the second device is enabled to communicate on a cellular wireless communication network based on authentication using the eSIM credentials transmitted by the first device.

In an embodiment, the method 280 further comprises receiving an eSIM transfer user code via the peer-to-peer wireless communication link by the eSIM sharing application from the second device and validating the eSIM transfer user code by the eSIM sharing application. In an embodiment, validating the eSIM transfer user code by the eSIM sharing application comprises requesting an authoritative copy of the user code from a network server by the eSIM sharing application and comparing the authoritative copy of the user code to the eSIM transfer user code.

In an embodiment, the method 280 further comprises transmitting a message to a network server by the second mobile communication device, wherein the message reports that the eSIM credentials are now associated to the second mobile communication device, whereby the network server is enabled to ensure that only one mobile communication device can use the eSIM credentials at a time. In an embodiment, the method 280 further comprises maintaining records of associations between eSIM credentials and device identities by the network server based on messages received from mobile communication devices reporting the associations and interworking with a media gateway or a cell site by the network server to ensure that only one mobile communication device can use the eSIM credentials at a time.

Figure 8:
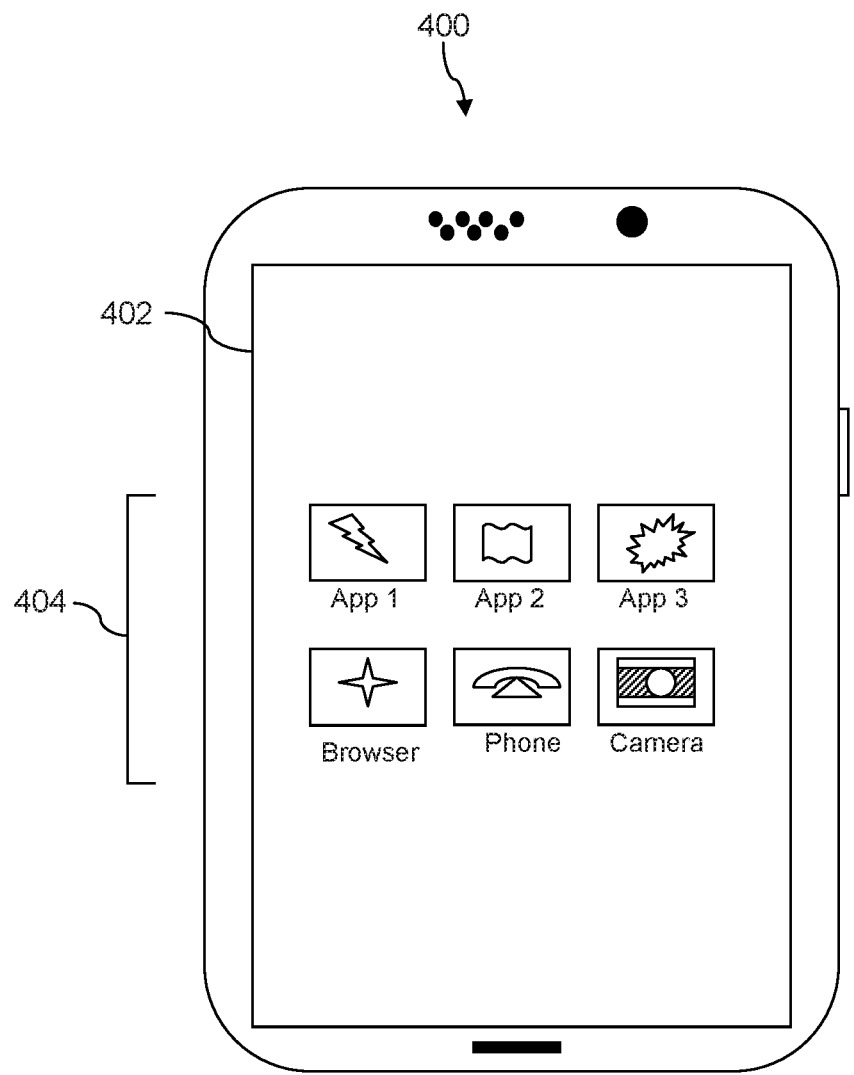
FIG. 8 is an illustration of a mobile communication device according to an embodiment of the disclosure.

FIG. 8 depicts the user equipment (UE) 400, which is operable for implementing aspects of the present disclosure, but the present disclosure should not be limited to these implementations. Though illustrated as a mobile phone, the UE 400 may take various forms including a wireless handset, a pager, a personal digital assistant (PDA), a gaming device, or a media player. The UE 400 includes a touchscreen display 402 having a touch-sensitive surface for input by a user. A small number of application icons 404 are illustrated within the touch screen display 402. It is understood that in different embodiments, any number of application icons 404 may be presented in the touch screen display 402. In some embodiments of the UE 400, a user may be able to download and install additional applications on the UE 400, and an icon associated with such downloaded and installed applications may be added to the touch screen display 402 or to an alternative screen. The UE 400 may have other components such as electro-mechanical switches, speakers, camera lenses, microphones, input and/or output connectors, and other components as are well known in the art. The UE 400 may present options for the user to select, controls for the user to actuate, and/or cursors or other indicators for the user to direct. The UE 400 may further accept data entry from the user, including numbers to dial or various parameter values for configuring the operation of the handset. The UE 400 may further execute one or more software or firmware applications in response to user commands. These applications may configure the UE 400 to perform various customized functions in response to user interaction. Additionally, the UE 400 may be programmed and/or configured over-the-air, for example from a wireless base station, a wireless access point, or a peer UE 400. The UE 400 may execute a web browser application which enables the touch screen display 402 to show a web page. The web page may be obtained via wireless communications with a base transceiver station, a wireless network access node, a peer UE 400 or any other wireless communication network or system.

Figure 9:
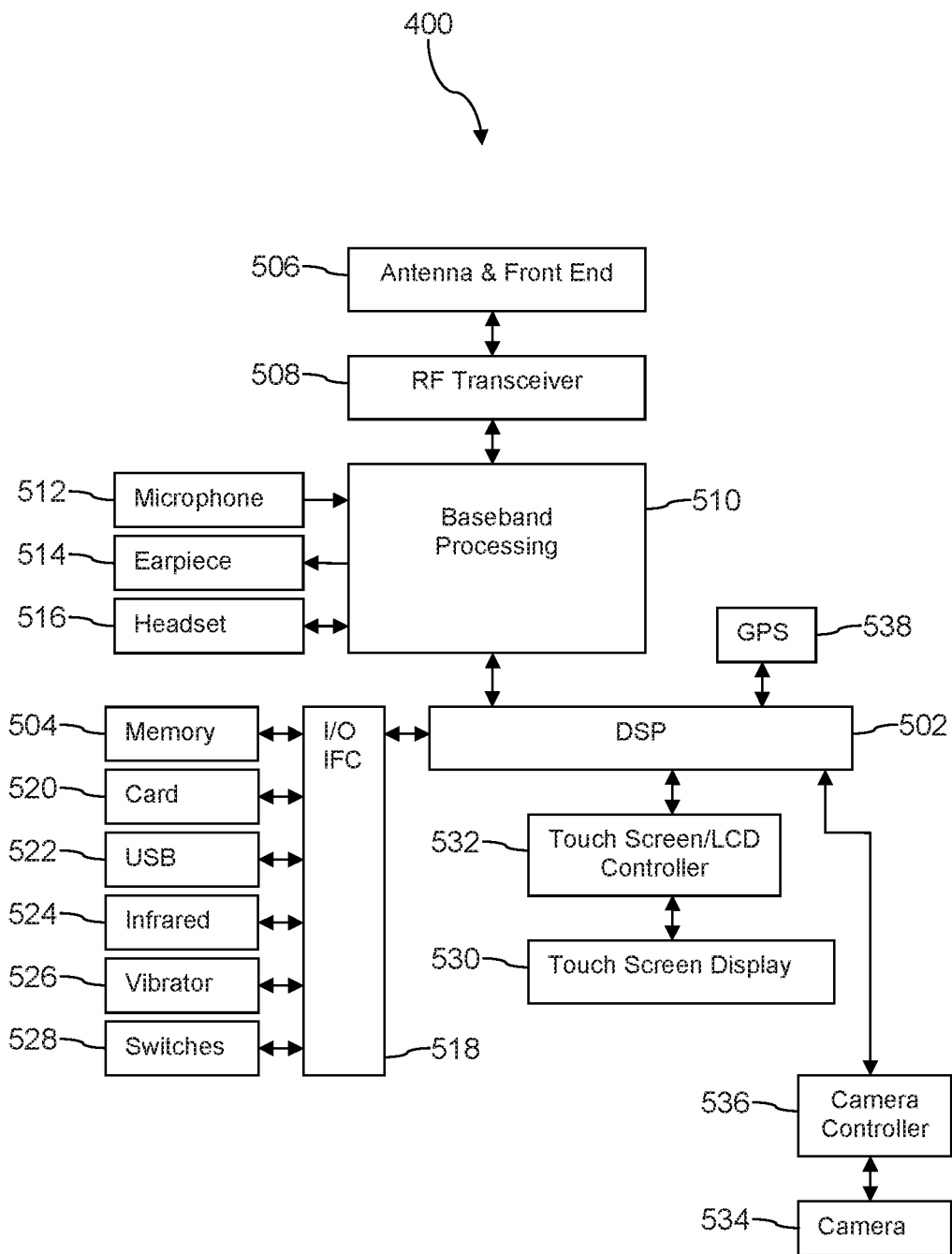
FIG. 9 is a block diagram of a hardware architecture of a mobile communication device according to an embodiment of the disclosure.

FIG. 9 shows a block diagram of the UE 400. While a variety of known components of handsets are depicted, in an embodiment a subset of the listed components and/or additional components not listed may be included in the UE 400. The UE 400 includes a digital signal processor (DSP) 502 and a memory 504. As shown, the UE 400 may further include an antenna and front end unit 506, a radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, one or more electro-mechanical switches 528, a touch screen liquid crystal display (LCD) with a touch screen display 530, a touch screen/LCD controller 532, a camera 534, a camera controller 536, and a global positioning system (GPS) receiver 538. In an embodiment, the UE 400 may include another kind of display that does not provide a touch sensitive screen. In an embodiment, the UE 400 may include both the touch screen display 530 and an additional display component that does not provide a touch sensitive screen. In an embodiment, the DSP 502 may communicate directly with the memory 504 without passing through the input/output interface 518. Additionally, in an embodiment, the UE 400 may comprise other peripheral devices that provide other functionality.

The DSP 502 or some other form of controller or central processing unit operates to control the various components of the UE 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the UE 400 to function as a peripheral device to exchange information with a personal computer or other computer system. The infrared port 524 and other optional ports such as a Bluetooth® interface or an IEEE 802.11 compliant wireless interface may enable the UE 400 to communicate wirelessly with other nearby handsets and/or wireless base stations. In an embodiment, the UE 400 may comprise a near field communication (NFC) transceiver. The NFC transceiver may be used to complete payment transactions with point-of-sale terminals or other communications exchanges. In an embodiment, the UE 400 may comprise a radio frequency identify (RFID) reader and/or writer device.

The switches 528 may couple to the DSP 502 via the input/output interface 518 to provide one mechanism for the user to provide input to the UE 400. Alternatively, one or more of the switches 528 may be coupled to a motherboard of the UE 400 and/or to components of the UE 400 via a different path (e.g., not via the input/output interface 518), for example coupled to a power control circuit (power button) of the UE 400. The touch screen display 530 is another input mechanism, which further displays text and/or graphics to the user. The touch screen LCD controller 532 couples the DSP 502 to the touch screen display 530. The GPS receiver 538 is coupled to the DSP 502 to decode global positioning system signals, thereby enabling the UE 400 to determine its position.

Figure 10A:
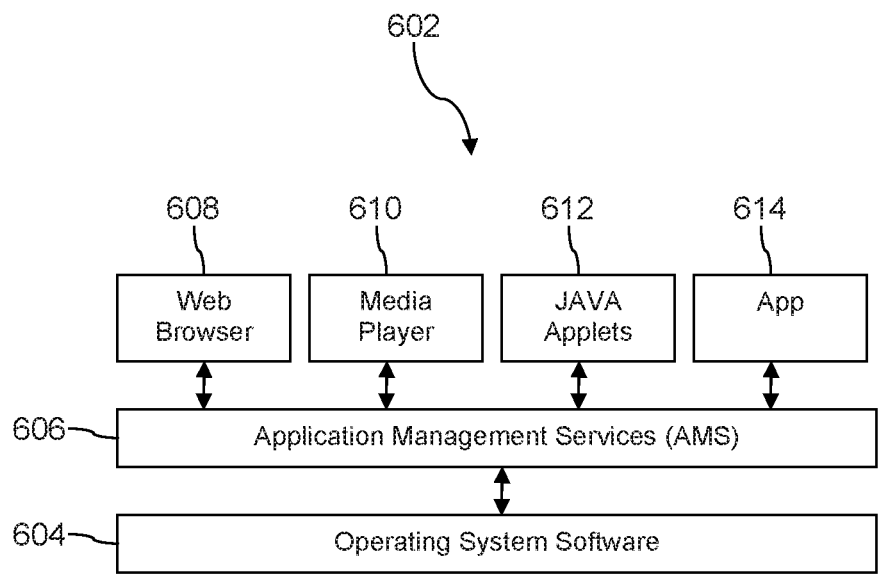
FIG. 10A is a block diagram of a software architecture of a mobile communication device according to an embodiment of the disclosure.

FIG. 10A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the UE 400. Also shown in FIG. 10A are a web browser application 608, a media player application 610, and JAVA applets 612. The web browser application 608 may be executed by the UE 400 to browse content and/or the Internet, for example when the UE 400 is coupled to a network via a wireless link. The web browser application 608 may permit a user to enter information into forms and select links to retrieve and view web pages. The media player application 610 may be executed by the UE 400 to play audio or audiovisual media. The JAVA applets 612 may be executed by the UE 400 to provide a variety of functionality including games, utilities, and other functionality.

Figure 10B:
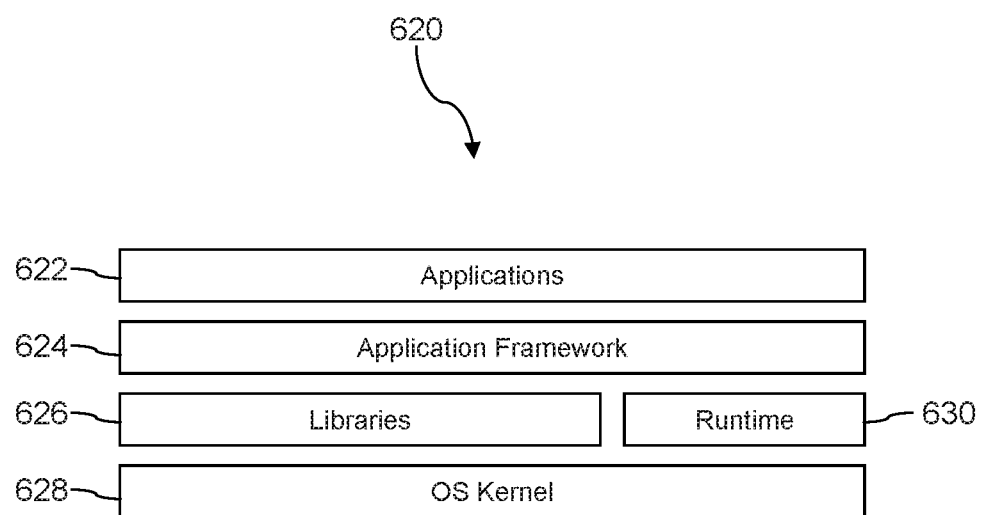
FIG. 10B is a block diagram of another software architecture of a mobile communication device according to an embodiment of the disclosure.

FIG. 10B illustrates an alternative software environment 620 that may be implemented by the DSP 502. The DSP 502 executes operating system kernel (OS kernel) 628 and an execution runtime 630. The DSP 502 executes applications 622 that may execute in the execution runtime 630 and may rely upon services provided by the application framework 624. Applications 622 and the application framework 624 may rely upon functionality provided via the libraries 626.

Figure 11:
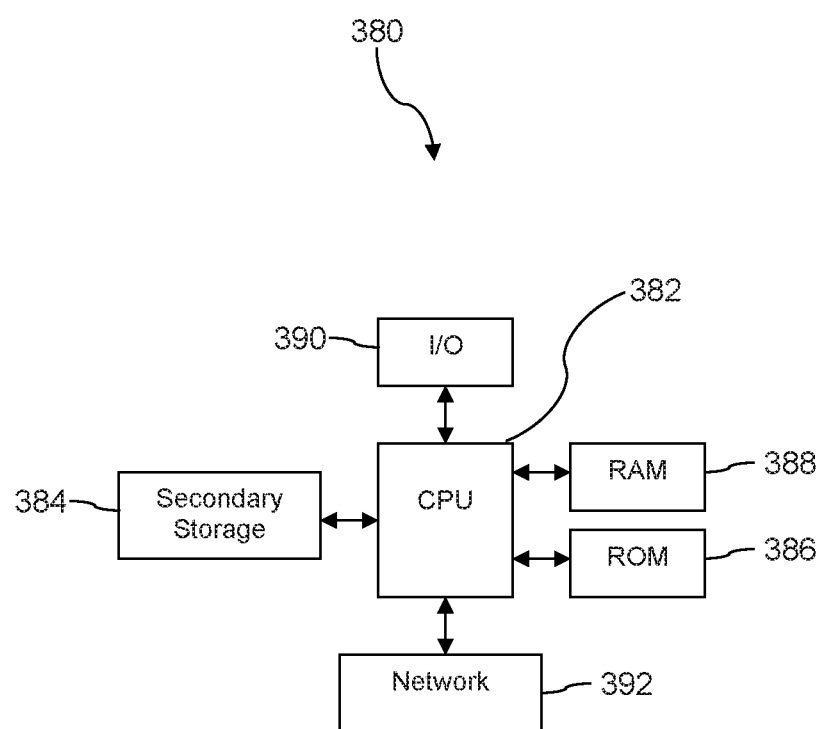
FIG. 11 is a block diagram of a computer system according to an embodiment of the disclosure.

FIG. 11 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards that promote radio communications using protocols such as code division multiple access (CDMA), global system for mobile communications (GSM), long-term evolution (LTE), near field communications (NFC), radio frequency identity (RFID), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of sharing electronic subscriber identity module (eSIM) credentials between two mobile communication devices, comprising:
    establishing a peer-to-peer wireless communication link from a first mobile communication device to a second mobile communication device by the first device;
    changing a state of an eSIM of the first device by an eSIM sharing application executing on the first device to a transfer-in-progress state;
    transmitting eSIM credentials to the second device via the peer-to-peer wireless communication link by the eSIM sharing application, where the eSIM sharing application reads the eSIM credentials from the eSIM of the first device;
    changing a state of the eSIM of the first device by the eSIM sharing application to a disabled-transferred state; and
    transmitting a disabled-transferred message to the second device via the peer-to-peer wireless communication link by the eSIM sharing application, whereby the second device is enabled to communicate on a cellular wireless communication network based on authentication using the eSIM credentials transmitted by the first device.

2. The method of claim 1, further comprising:
    receiving an eSIM transfer user code via the peer-to-peer wireless communication link by the eSIM sharing application from the second device; and
    validating the eSIM transfer user code by the eSIM sharing application.

3. The method of claim 1, wherein the peer-to-peer wireless communication link is a WiFi wireless communication link, a Bluetooth wireless communication link, or a near field communication wireless communication link.

4. The method of claim 1, further comprising transmitting a message to a network server by the second mobile communication device, wherein the message reports that the eSIM credentials are now associated to the second mobile communication device, whereby the network server is enabled to ensure that only one mobile communication device can use the eSIM credentials at a time.

5. The method of claim 4, further comprising:
    maintaining records of associations between eSIM credentials and device identities by the network server based on messages received from mobile communication devices reporting the associations; and
    interworking with a media gateway or a cell site by the network server to ensure that only one mobile communication device can use the eSIM credentials at a time.

6. The method of claim 1, wherein the cellular wireless communication network provides wireless communication service according to at least one of a long term evolution (LTE), a code division multiple access (CDMA), or a global system for mobile communications (GSM) telecommunication protocol.

7. The method of claim 1, wherein the first device is one of a mobile phone, a smart phone, a personal digital assistant (PDA), a headset computer, a wearable computer, a laptop computer, a notebook computer, or a tablet computer.

8. The method of claim 1, wherein the eSIM credentials comprise at least one of a universal integrated circuit card identifier (ICCID), an international mobile subscriber identity (IMSI), mobile station integrated service digital network identity (MSISDN), mobile dialing number (MDN) and at least one of a network authentication value or key.

9. The method of claim 7, wherein the eSIM credentials comprises a mobile username and a mobile Internet Protocol (IP) password.

10. A method of sharing electronic subscriber identity module (eSIM) credentials between two mobile communication devices, comprising:
    establishing a peer-to-peer wireless communication link between a first mobile communication device and a second mobile communication device;
    presenting a user interface on the second device by an eSIM sharing application executing on the second device, where the user interface prompts for input of an eSIM transfer user code;
    receiving the eSIM transfer user code by the eSIM sharing application from the user interface;
    receiving eSIM credentials from the first device via the peer-to-peer wireless communication link by the eSIM sharing application;
    storing the eSIM credentials in an eSIM of the second device;
    receiving a disabled-transferred message from the first device via the peer-to-peer wireless communication link by the eSIM sharing application;
    changing a state of the eSIM of the second device by the eSIM sharing application to a disabled state;
    prompting the user by the user interface to select the second device for transfer of the eSIM credentials and to use the second device for cellular wireless communication;
    receiving an eSIM transfer input by the eSIM sharing application from the user interface; and changing the state of the eSIM of the second device by the eSIM sharing application to an enabled state, whereby the second device is enabled to communicate on a cellular wireless communication network based on authentication using the eSIM credentials received from the first device.

11. The method of claim 10, further comprising validating the eSIM transfer user code by the eSIM sharing application.

12. The method of claim 10, further comprising transmitting the eSIM transfer user code by the eSIM sharing application via the peer-to-peer wireless communication link to the first device, whereby the first device validates the eSIM transfer user code.

13. The method of claim 10, further comprising:
transmitting an equipment identity number (EID) of the second device via the peer-to-peer wireless communication link by the eSIM sharing application to the first device; and
receiving an EID of the first device via the peer-to-peer wireless communication link by the eSIM sharing application from the first device.

14. The method of claim 13, wherein the eSIM credentials received from the first device are received in a message that comprises an EID value, and further comprising validating by the eSIM sharing application that the EID value matches the EID of the first device.

15. The method of claim 14, further comprising validating by the eSIM sharing application that an EID value contained by the disabled-transferred message matches the EID of the first device.

16. A method of sharing electronic subscriber identity module (eSIM) credentials between two mobile communication devices, comprising:
establishing a peer-to-peer wireless communication link from a first mobile communication device to a second mobile communication device by the first device;
changing a state of an eSIM of the first device by an eSIM sharing application executing on the first device to a transfer-in-progress state;
transmitting eSIM credentials to the second device via the peer-to-peer wireless communication link by the eSIM sharing application, where the eSIM sharing application reads the eSIM credentials from the eSIM of the first device;
deleting eSIM credentials from the eSIM of the first device by the eSIM sharing application; and
transmitting an eSIM deleted message to the second device via the peer-to-peer wireless communication link by the eSIM sharing application, whereby the second device is enabled to communicate on a cellular wireless communication network based on authentication using the eSIM credentials transmitted by the first device.

17. The method of claim 16, further comprising:
receiving an eSIM transfer user code via the peer-to-peer wireless communication link by the eSIM sharing application from the second device; and
validating the eSIM transfer user code by the eSIM sharing application.

18. The method of claim 17, wherein validating the eSIM transfer user code by the eSIM sharing application comprises requesting an authoritative copy of the user code from a network server by the eSIM sharing application and comparing the authoritative copy of the user code to the eSIM transfer user code.

19. The method of claim 16, further comprising transmitting a message to a network server by the second mobile communication device, wherein the message reports that the eSIM credentials are now associated to the second mobile communication device, whereby the network server is enabled to ensure that only one mobile communication device can use the eSIM credentials at a time.

20. The method of claim 19, further comprising:
maintaining records of associations between eSIM credentials and device identities by the network server based on messages received from mobile communication devices reporting the associations; and
interworking with a media gateway or a cell site by the network server to ensure that only one mobile communication device can use the eSIM credentials at a time.

* * * * *